(12) United States Patent
Kunen et al.

(10) Patent No.: US 11,487,597 B1
(45) Date of Patent: *Nov. 1, 2022

(54) STORED PROCEDURES IN A NETWORK BASED DATABASE SYSTEM

(71) Applicant: Snowflake Inc., Bozeman, MT (US)

(72) Inventors: Isaac Kunen, Seattle, WA (US); Srinath Shankar, Belmont, CA (US); Zihan Li, Mountain View, CA (US); Khushboo Bhatia, Belmont, CA (US); Edward Ma, San Jose, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/658,530

(22) Filed: Apr. 8, 2022

Related U.S. Application Data

(63) Continuation of application No. 17/536,173, filed on Nov. 29, 2021, now Pat. No. 11,321,154, which is a continuation of application No. 17/390,930, filed on Jul. 31, 2021, now Pat. No. 11,216,322.

(60) Provisional application No. 63/197,760, filed on Jun. 7, 2021.

(51) Int. Cl.
*G06F 9/54* (2006.01)
*G06F 21/53* (2013.01)
*G06F 16/28* (2019.01)
*G06F 16/2455* (2019.01)

(52) U.S. Cl.
CPC .......... *G06F 9/547* (2013.01); *G06F 16/2455* (2019.01); *G06F 16/289* (2019.01); *G06F 21/53* (2013.01)

(58) Field of Classification Search
None
See application file for complete search history.

(56) References Cited

U.S. PATENT DOCUMENTS

| | | | |
|---|---|---|---|
| 6,016,495 | A | 1/2000 | Mckeehan et al. |
| 10,997,286 | B1 | 5/2021 | Brossard et al. |
| 11,138,192 | B1 | 10/2021 | Chintala et al. |
| 11,216,322 | B1 | 1/2022 | Kunen et al. |

(Continued)

OTHER PUBLICATIONS

"U.S. Appl. No. 17/390,930, Notice of Allowance dated Nov. 1, 2021", 8 pgs.

(Continued)

*Primary Examiner* — Craig C Dorais
(74) *Attorney, Agent, or Firm* — Schwegman Lundberg & Woessner, P.A.

(57) ABSTRACT

Disclosed are systems, methods, and non-transitory computer-readable media for a providing stored procedures in a network-based database system. A database system executes a stored procedure within a sandbox process. The sandbox process separates the stored procedure from the other services and processes of the database system and may also limit the resources (e.g., storage, memory, etc.) and functionality available to the stored procedure. Stored procedures are commonly designed to execute database queries that are processed by other components of the database system. To provide for secure communication between the stored procedure and the other components of the database system, the sandbox process is loaded with java database connectivity (JDBC) libraries (e.g., JDBC instance) that is modified to limit the communication abilities of the stored procedure.

30 Claims, 7 Drawing Sheets

(56) References Cited

U.S. PATENT DOCUMENTS

2003/0033517 A1 2/2003 Rutherglen et al.
2020/0177476 A1 6/2020 Agarwal et al.

OTHER PUBLICATIONS

"U.S. Appl. No. 17/536,173, Notice of Allowance dated Feb. 24, 2022", 9 pgs.

STORED PROCEDURES IN A NETWORK BASED DATABASE SYSTEM

CROSS-REFERENCE TO RELATED APPLICATIONS

This application is a Continuation of U.S. patent application Ser. No. 17/536,173, filed Nov. 29, 2021, which is a Continuation of U.S. patent application Ser. No. 17/390,930 filed Jul. 31, 2021 and now issued as U.S. Pat. No. 11,216, 322, which claims the benefit of priority of U.S. Provisional Application No. 63/197,760, filed on Jun. 7, 2021, the contents of which are incorporated herein by reference in their entireties.

TECHNICAL FIELD

Embodiments of the disclosure relate generally to a network-based database system and, more specifically, to providing stored procedures in a network-based database system.

BACKGROUND

Stored procedures are subroutines stored within a database to invoke specified functionality. For example, the stored procedure is called using a specified command, which causes execution of the stored procedure within the database. Stored procedures allow users to define customized functionality, which can be easily reused as desired.

Traditional database systems that were managed on premises are being replaced with multi-tenant cloud-based database services. Multi-tenant cloud-based database services provide cloud-accessible database services for multiple accounts. Providing stored procedures in this type of environment provides several technical challenges, as the stored procedures represent a potential security risk.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
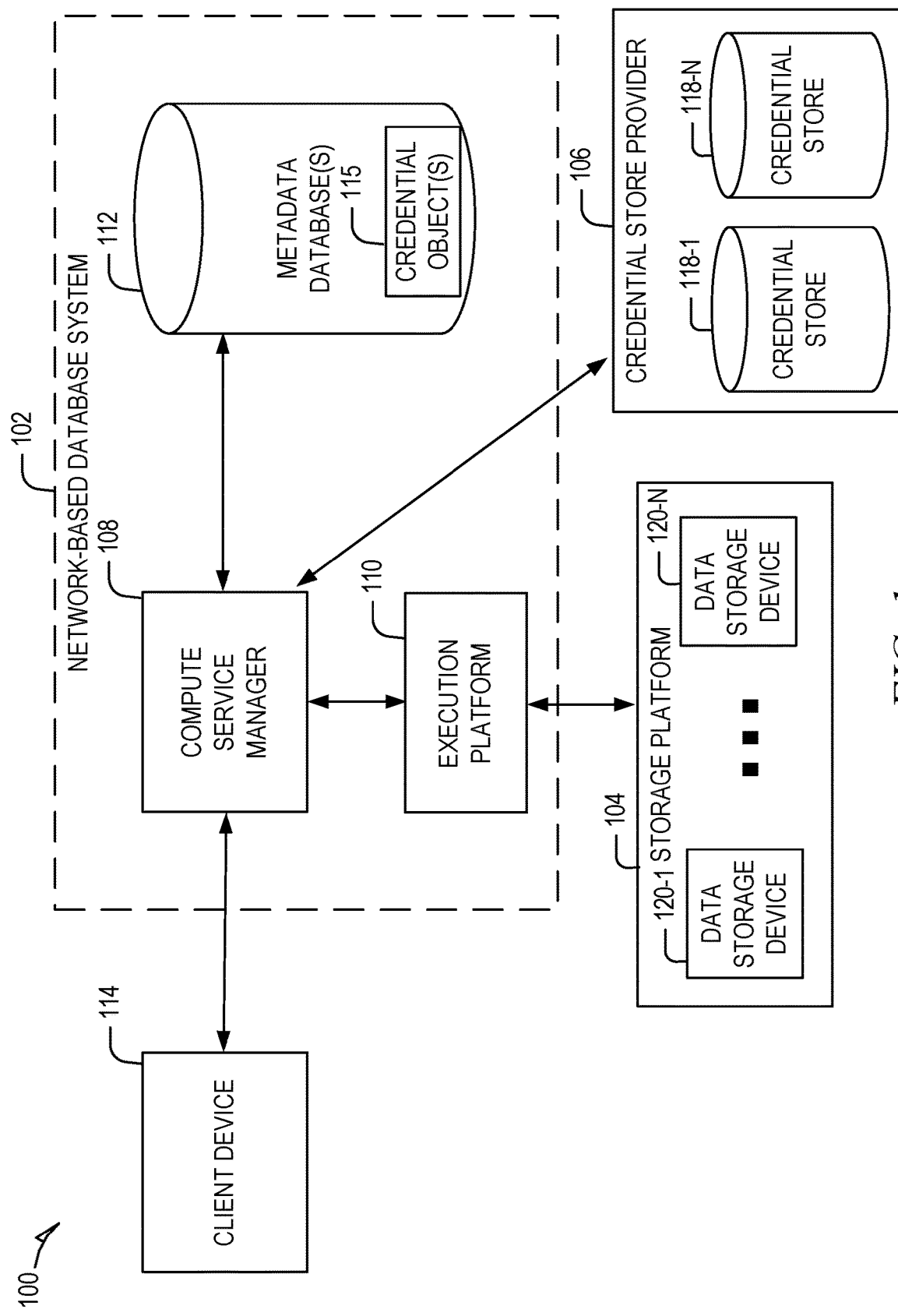
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As discussed earlier, implementing stored procedures in a multi-tenant cloud-based database system presents several technical challenges. For example, stored procedures represent a potential security risk because they are applications executing within the database system. A nefarious user could potentially design a stored procedure to access confidential data from the other accounts of the database system and transmit the confidential data to external network locations.

To alleviate these issues, a database system executes a stored procedure within a sandbox process. The sandbox process separates the stored procedure from the other services and processes of the database system and may also limit the resources (e.g., storage, memory, etc.) and functionality available to the stored procedure. Stored procedures are commonly designed to execute database queries that are processed by other components of the database system. To provide for secure communication between the stored procedure and the other components of the database system, the sandbox process is loaded with java database connectivity (JDBC) libraries (e.g., JDBC instance) that is modified to limit the communication abilities of the stored procedure.

The JDBC instance provides an Application Programming Interface (API) that enables the stored procedure to communicate with other components and utilize the services of the database system. To limit the communication abilities of the stored procedure, the driver of the JDBC instance loaded into the sandbox process is modified to restrict communications with external networks and/or to enable communication with a defined connection object. For example, the JDBC instance may be modified to limit communications to a single execution node process that facilitates communication between the stored procedure and the other services and components of the database system.

To execute a database query, the stored procedure executing in the sandbox process invokes a JDBC method that causes a JDBC instance in the sandbox process to communicate with the execution node. For example, the JDBC instance converts the database query into a remote procedure call (e.g., Google Remote Procedure Call (gRPC)) that is used to communicate with the execution node process. In turn, the execution node process submits a database query to a compute service manager on behalf of the stored procedure. For example, the execution node process may issue the database query to a specific endpoint of the compute service manager that is designated to process database queries from stored procedures.

Responses to a database query are returned to the stored procedure in a similar manner. For example, the execution node process receives the response from the compute service manager and converts the response into a remote procedure call, which is returned to the sandbox process. The JDBC instance executing in the sandbox process converts the remote procedure call into a format that is compatible with the stored procedure to provide the stored procedure with the response to the database query.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS®, Microsoft Azure Blob Storage®, or Google Cloud Storage), and a cloud credential store provider 106. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the cloud credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the storage platform 104).

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3TM storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
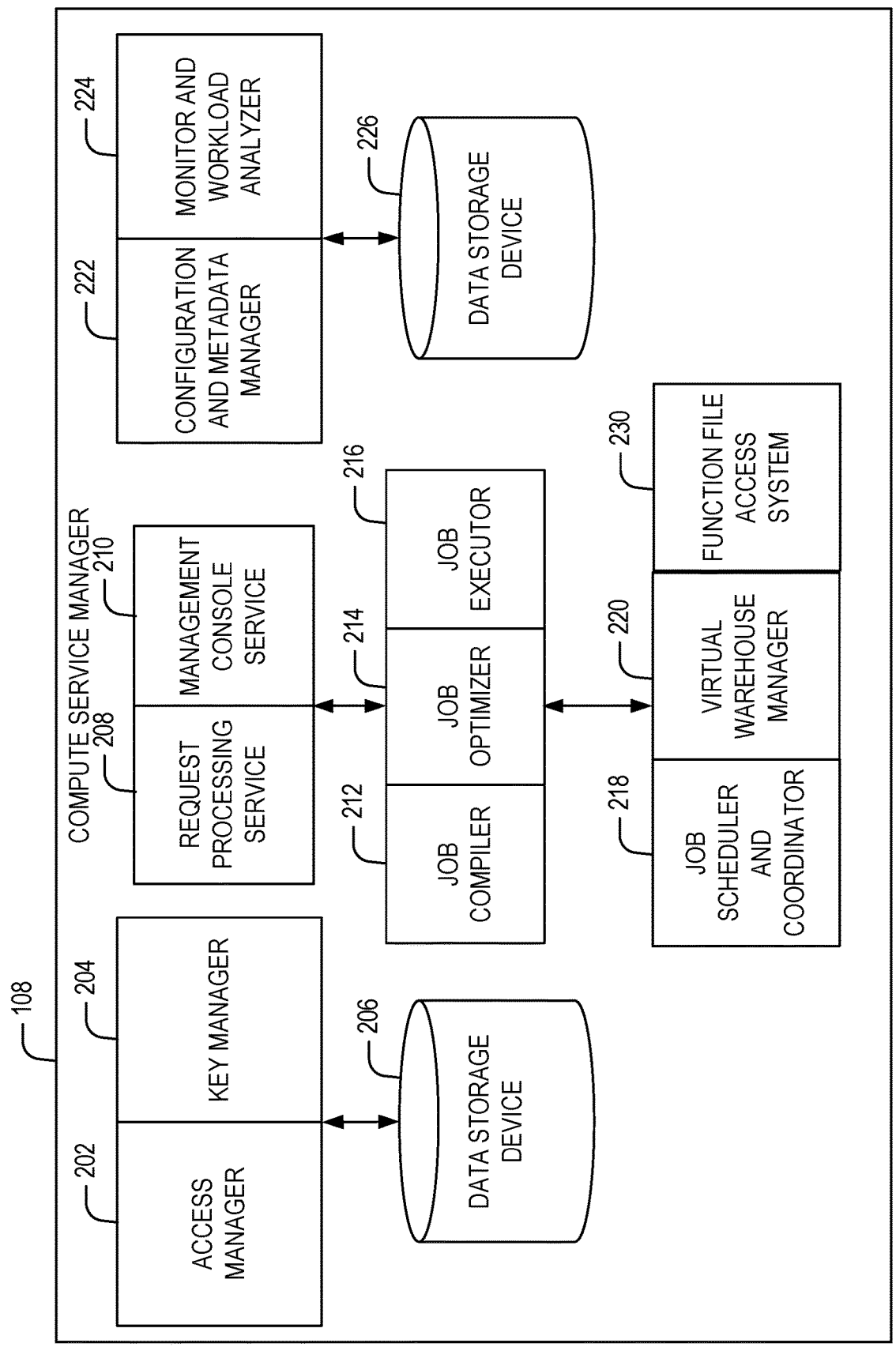
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. The function file access system 230 is configured to manage file access to files in a stage (e.g., internal or external stage) using user defined function signatures and UDFs that point to the stage, as discussed in further detail below.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
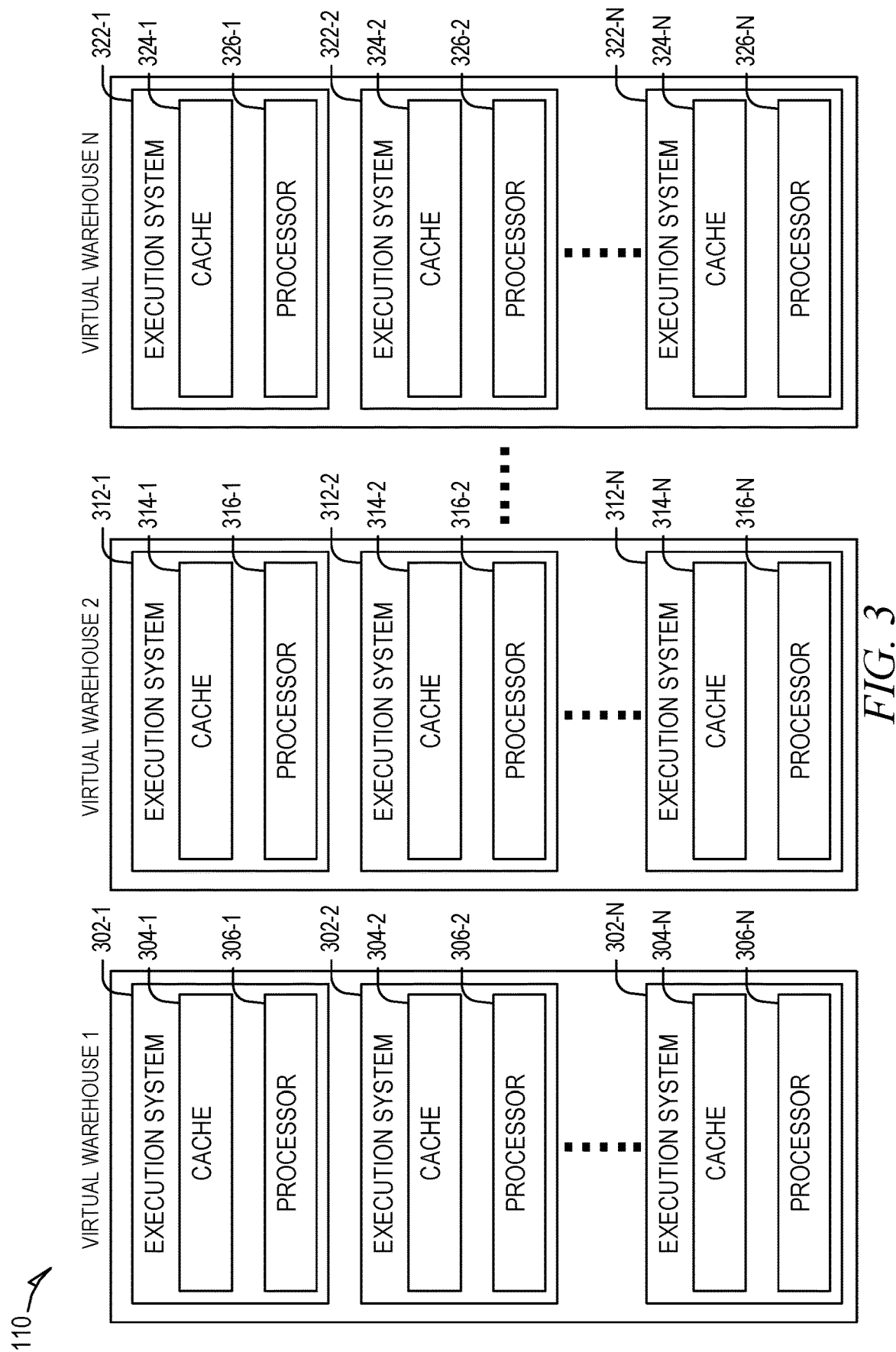
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
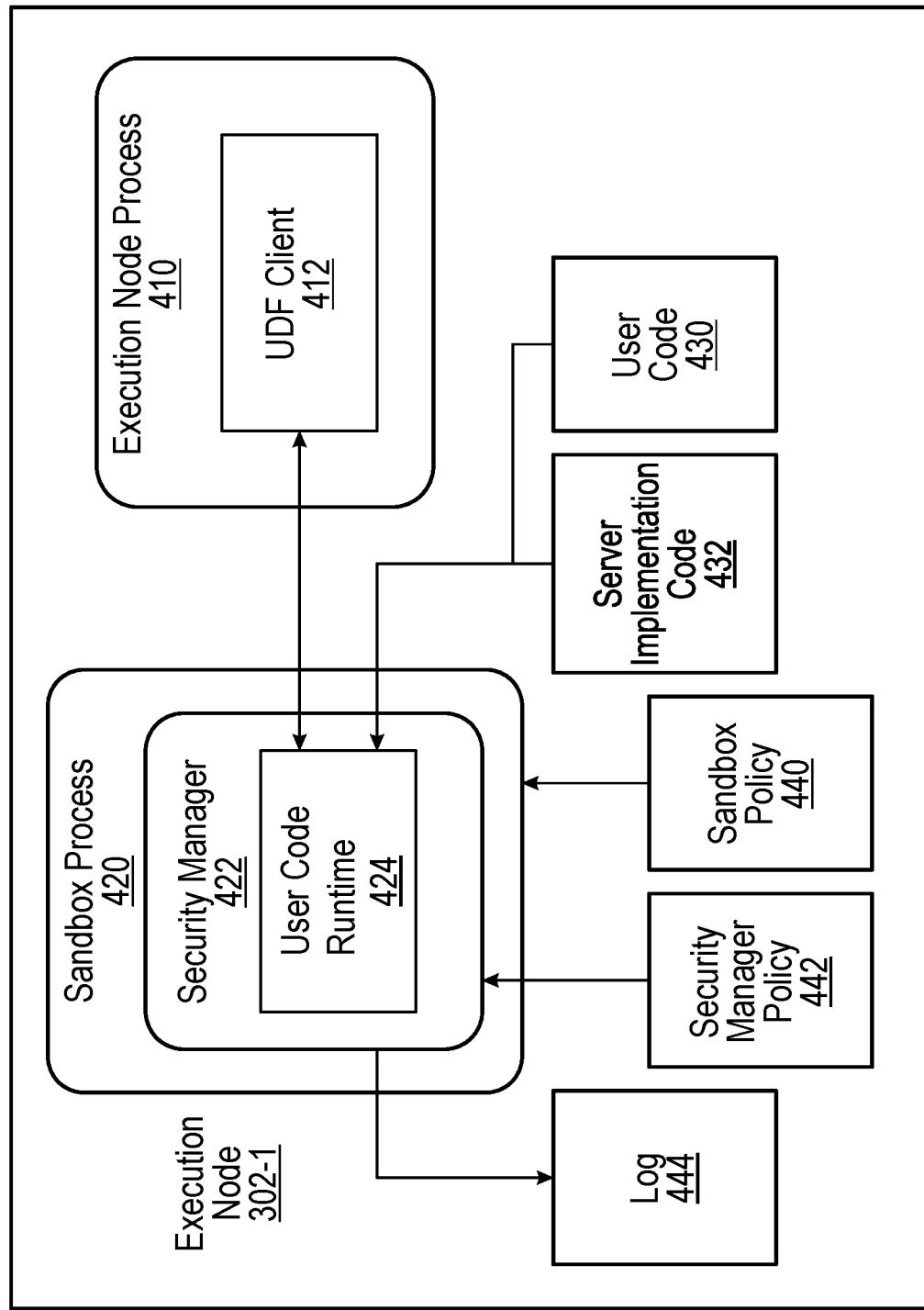
FIG. 4 is a computing environment conceptually illustrating an example software architecture executing a user defined function (UDF) by a process running on a given execution node of the execution platform, in accordance with some embodiments of the present disclosure.

FIG. 4 is a computing environment 400 conceptually illustrating an example software architecture executing a user defined function (UDF) by a process running on a given execution node of the execution platform 110, in accordance with some embodiments of the present disclosure.

As illustrated, the execution node 302-1 from the execution platform 110 includes an execution node process 410, which in an embodiment is running on the processor 306-1 and can also utilize memory from the cache 304-1 (or another memory device or storage). As mentioned herein, a "process" or "computing process" can refer to an instance of a computer program that is being executed by one or more threads by an execution node or execution platform.

As mentioned before, the compute service manager 108 validates all communication from the execution platform 110 to validate that the content and context of that communication are consistent with the task(s) known to be assigned to the execution platform 110. For example, the execution platform 110 executing a query A is not allowed to request access to a particular data source (e.g., data storage device 226 or any one of the storage devices in the cloud storage platform 104) that is not relevant to query A. In an example, the execution node 302-1 may need to communicate with a second execution node (e.g., execution node 302-2), but the security mechanisms described herein can disallow communication with a third execution node (e.g., execution node 312-1). Moreover, any such illicit communication can be recorded (e.g., in a log 444 or other location). Further, the information stored on a given execution node is restricted to data relevant to the current query and any other data is unusable by destruction or encryption where the key is unavailable.

The execution node process 410 is executing a UDF client 412 in the example of FIG. 4. In an embodiment, the UDF client 412 is implemented to support UDFs written in a particular programming language such as JAVA, and the like. In an embodiment, the UDF client 412 is implemented in a different programming language (e.g., C or C++) than the user code 430, which can further improve security of the computing environment 400 by using a different codebase (e.g., one without the same or fewer potential security exploits).

User code 430 may be provided as a package e.g., in the form of a JAR (JAVA archive) file which includes code for one or more UDFs. Server implementation code 432, in an embodiment, is a JAR file that initiates a server which is responsible for receiving requests from the execution node process 410, assigning worker threads to execute user code, and returning the results, among other types of server tasks.

In an implementation, an operation from a UDF (e.g., JAVA based UDF) can be performed by a user code runtime 424 executing within a sandbox process 420 (e.g., UDF server). In an embodiment, the user code runtime 424 is implemented as a virtual machine, such as a JAVA virtual machine (JVM). Since the user code runtime 424 advantageously executes in a separate process relative to the execution node process 410, there is a lower risk of manipulating the execution node process 410. Results of performing the operation, among other types of information or messages, can be stored in a log 444 for review and retrieval. In an embodiment, the log 444 can be stored locally in memory at the execution node 302-1, or at a separate location such as the storage platform 104. Moreover, such results can be returned from the user code runtime 424 to the UDF client 412 utilizing a high-performance protocol (e.g., without serialization or deserialization of data, without memory copies; operates on record batches without having to access individual columns, records or cells; utilizes efficient remote procedure call techniques and network protocol(s) for data transfer) for data transfer (e.g., distributed datasets) that further provides authentication and encryption of the data transfer. In an embodiment, the UDF client 412 uses a data transport mechanism that supports a network transfer of columnar data between the user code runtime 424 (and vice-versa) with the aforementioned advantages described above.

Security Manager 422, in an example, can prevent completion of an operation from a given UDF by throwing an exception (e.g., if the operation is not permitted), or returns (e.g., doing nothing) if the operation is permitted. In an implementation, the Security Manager 422 is implemented as a JAVA security manager object that allows applications to implement a security policy such as a security manager policy 442, and enables an application to determine, before performing a possibly unsafe or sensitive operation, what the operation is and whether it is being attempted in a security context that allows the operation to be performed. The security manager policy 442 can be implemented as a file with permissions that the user code runtime 424 is granted. The application (e.g., UDF executed by the user code runtime 424) therefore can allow or disallow the operation based at least in part on the security policy.

Sandbox process 420, in an embodiment, is a sub-process (or separate process) from the execution node process 410. A sub-process, in an embodiment, refers to a child process of a given parent process (e.g., in this example, the execution node process 410). The sandbox process 420, in an example, is a program that reduces the risk of security breaches by restricting the running environment of untrusted applications using security mechanisms such as namespaces and secure computing modes (e.g., using a system call filter to an executing process and all its descendants, thus reducing the attack surface of the kernel of a given operating system). Moreover, in an example, the sandbox process 420 is a lightweight process in comparison to the execution node process 410 and is optimized (e.g., closely coupled to security mechanisms of a given operating system kernel) to process a database query in a secure manner within the sandbox environment.

In an embodiment, the sandbox process 420 can utilize a virtual network connection in order to communicate with other components within the subject system. A specific set of rules can be configured for the virtual network connection with respect to other components of the subject system. For example, such rules for the virtual network connection can be configured for a particular UDF to restrict the locations (e.g., particular sites on the Internet or components that the UDF can communicate) that are accessible by operations performed by the UDF. Thus, in this example, the UDF can be denied access to particular network locations or sites on the Internet.

The sandbox process 420 can be understood as providing a constrained computing environment for a process (or processes) within the sandbox, where these constrained processes can be controlled and restricted to limit access to certain computing resources.

Examples of security mechanisms can include the implementation of namespaces in which each respective group of processes executing within the sandbox environment has access to respective computing resources (e.g., process IDs, hostnames, user IDs, file names, names associated with network access, and inter-process communication) that are not accessible to another group of processes (which may have access to a different group of resources not accessible by the former group of processes), other container implementations, and the like. By having the sandbox process 420 execute as a sub-process to the execution node process 410, in some embodiments, latency in processing a given database query can be substantially reduced (e.g., a reduction in latency by a factor of 10× in some instances) in comparison with other techniques that may utilize a virtual machine solution by itself.

As further illustrated, the sandbox process 420 can utilize a sandbox policy 440 to enforce a given security policy. The sandbox policy 440 can be a file with information related to a configuration of the sandbox process 420 and details regarding restrictions, if any, and permissions for accessing and utilizing system resources. Example restrictions can include restrictions to network access, or file system access (e.g., remapping file system to place files in different locations that may not be accessible, other files can be mounted in different locations, and the like). The sandbox process 420 restricts the memory and processor (e.g., CPU) usage of the user code runtime 424, ensuring that other operations on the same execution node can execute without running out of resources.

As mentioned above, the sandbox process 420 is a sub-process (or separate process) from the execution node process 410, which in practice means that the sandbox process 420 resides in a separate memory space than the execution node process 410. In an occurrence of a security breach in connection with the sandbox process 420 (e.g., by errant or malicious code from a given UDF), if arbitrary memory is accessed by a malicious actor, the data or information stored by the execution node process is protected.

Although the above discussion of FIG. 4 describes components that are implemented using JAVA (e.g., object oriented programming language), it is appreciated that the other programming languages (e.g., interpreted programming languages) are supported by the computing environment 400. In an embodiment, PYTHON is supported for implementing and executing UDFs in the computing environment 400. In this example, the user code runtime 424 can be replaced with a PYTHON interpreter for executing operations from UDFs (e.g., written in PYTHON) within the sandbox process 420.

The computing environment 400 shown in FIG. 4 to execute a UDF may be similarly used to execute a stored procedure. Unlike a UDFs, a stored procedure is an executable application that may execute a database query as part of its provided functionality. Stored procedures therefore represent a potential security risk because they could potentially be designed to access confidential data from the other accounts of the database system and transmit the confidential data to external network locations. To alleviate these issues, the stored procedure is executed within a sandbox process 420, as with a UDF, however additional measures are implemented to provide for secure communication between the stored procedure and the other components of the database system, as well as to provide advanced functionality to the stored procedure.

Figure 5:
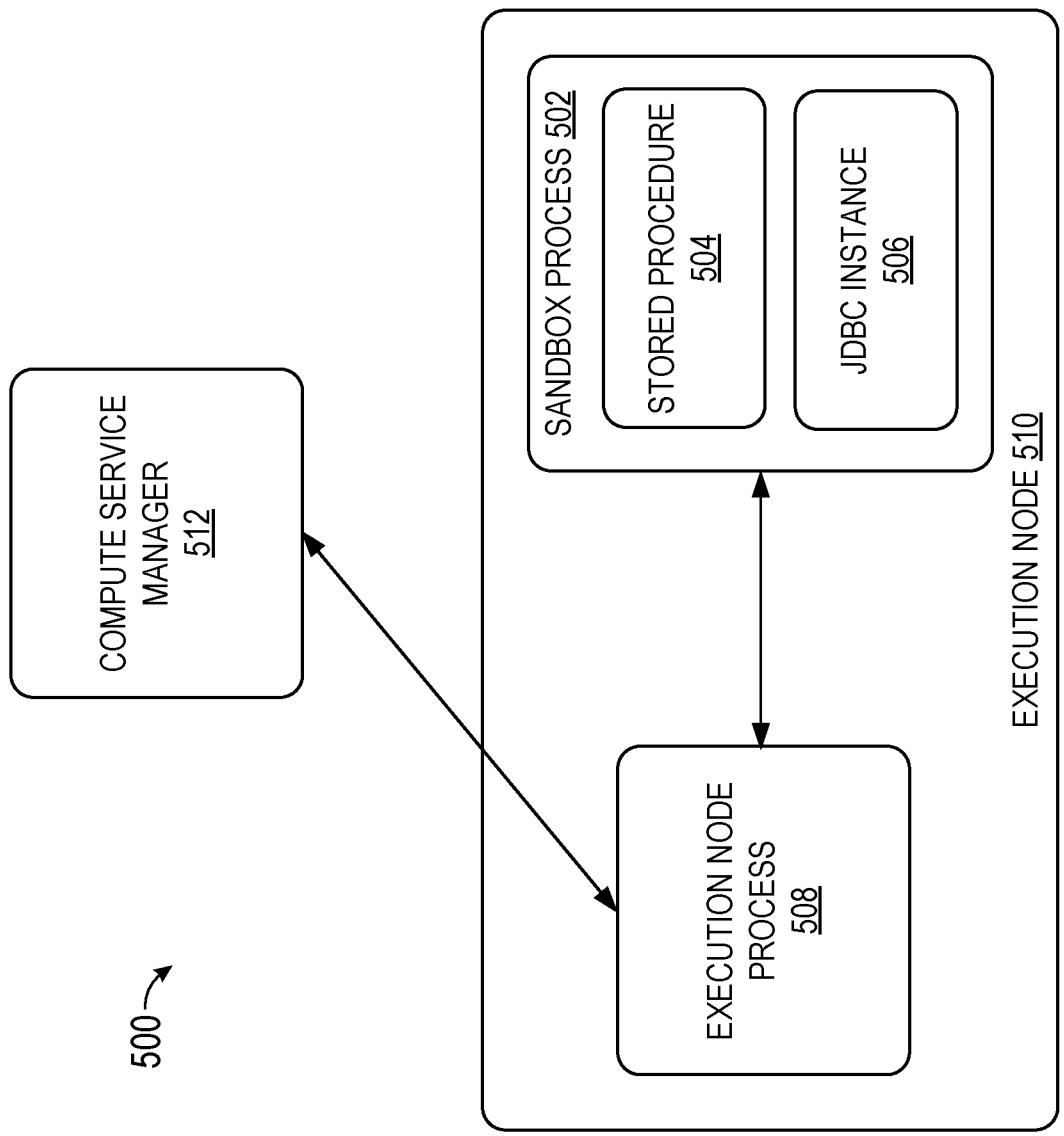
FIG. 5 is a computing environment conceptually illustrating an example software architecture executing a stored procedure, in accordance with some embodiments of the present disclosure.

FIG. 5 is a computing environment 500 conceptually illustrating an example software architecture executing a stored procedure 504, in accordance with some embodiments of the present disclosure. As shown, an execution node process 508 and a sandbox process 502 are executing within an execution node 510. A stored procedure 504 is executing within the sandbox process 502. The sandbox process 502 separates the stored procedure 504 from the other services and processes of the database system 102 and may also limit the resources (e.g., storage, memory, etc.) and functionality available to the stored procedure 504. Stored procedures 504 are commonly designed to execute database queries that are processed by other components of the database system 102. To provide for secure communication between the stored procedure 504 and the other components of the database system 102, the sandbox process 502 is loaded with a JDBC instance 506 that is modified to limit the communication abilities of the stored procedure 504.

The JDBC instance 506 provides an Application Programming Interface (API) that enables the stored procedure 504 to communicate with other components and utilize the services of the database system 102. To limit the communication abilities of the stored procedure 504, the driver of the JDBC instance 506 loaded into the sandbox process 502 is modified to restrict communications with external networks and/or to enable communication with a defined connection object. For example, the JDBC instance 506 may be modified to limit communications to a single execution node process 508 that facilitates communication between the stored procedure 504 and the other services and components of the database system 102.

To execute a database query, the stored procedure 504 executing in the sandbox process 502 invokes a JDBC method that causes the JDBC instance 506 in the sandbox process 502 to communicate with the execution node process 508. For example, the JDBC instance 506 converts the database query into a remote procedure call (e.g., gRPC) that is used to communicate with the execution node process 508. In turn, the execution node process 508 submits a database query to the compute service manager 512 on behalf of the stored procedure 504. For example, the execution node process 508 may issue the database query to a specific endpoint of the compute service manager 512 that is designated to process database queries from stored procedures 504.

In turn, the compute service manager 512 may execute the received database query, as was described earlier in relation to FIGS. 1 and 2. Executing the database query may produce specified data and/or an output that is to be returned to the stored procedure 504 as a response to the database query.

Responses to a database query are returned to the stored procedure 504 in a similar manner to which the database query is provided from the stored procedure 504 to the compute service manager 512. For example, the compute service manager 512 provides the response to the execution node process 508. After receiving the response from the compute service manager 512, the execution node process 508 converts the response into a remote procedure call, which is returned to the sandbox process 502. The JDBC instance 506 executing in the sandbox process 502 converts the remote procedure call into a format that is compatible with the stored procedure 504 to provide the stored procedure with the response to the database query.

Figure 6:
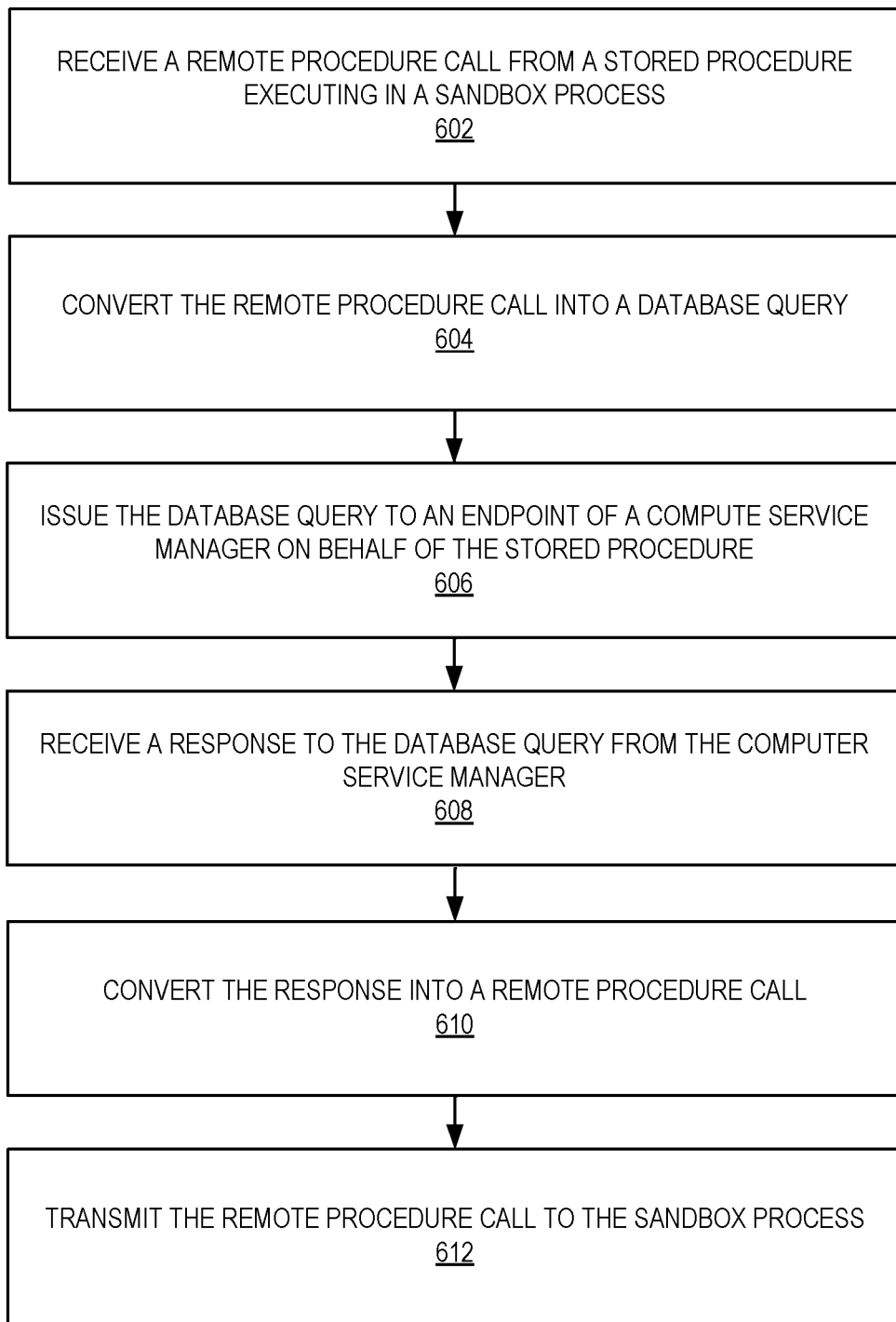
FIG. 6 is a flowchart showing an example method of providing stored procedures in a network-based database system, according to some example embodiments.

FIG. 6 is a flowchart showing an example method 600 of providing stored procedures in a network-based database system, according to some example embodiments. The method 600 may be embodied in computer readable instructions for execution by one or more processors such that the operations of the method 600 may be performed in part or in whole by the execution node 510; accordingly, the method 600 is described below by way of example with reference thereto. However, it shall be appreciated that at least some of the operations of the method 600 may be deployed on various other hardware configurations and the method 600 is not intended to be limited to the execution node 510.

At operation 602, the execution node process 508 receives a remote procedure call from a stored procedure 504 executing in a sandbox process 502. The sandbox process 502 separates the stored procedure 504 from the other services and processes of the database system 102 and may also limit the resources (e.g., storage, memory, etc.) and functionality available to the stored procedure 504. Stored procedures 504 are commonly designed to execute database queries that are processed by other components of the database system 102. To provide for secure communication between the stored procedure 504 and the other components of the database system, the sandbox process 502 is loaded with a JDBC instance 506 that is modified to limit the communication abilities of the stored procedure 504.

The JDBC instance 506 provides an Application Programming Interface (API) that enables the stored procedure 504 to communicate with other components and utilize the services of the database system. To limit the communication abilities of the stored procedure 504, the driver of the JDBC instance 506 loaded into the sandbox process 502 is modified to restrict communications with external networks and/or to enable communication with a defined connection object. For example, the JDBC instance 506 may be modified to limit communications to a single execution node process 508 that facilitates communication between the stored procedure 504 and the other services and components of the database system 102.

To execute a database query, the stored procedure 504 executing in the sandbox process 502 invokes a JDBC method that causes the JDBC instance 506 in the sandbox process 502 to communicate with the execution node process 508. For example, the JDBC instance 506 converts the database query into a remote procedure call (e.g., gRPC) that is used to communicate with the execution node process 508.

At operation 604, the execution node process 508 converts the remote procedure call into a database query and, at operation 606, the execution node process 508 issues the database query to an endpoint of a compute service manager 512 on behalf of the stored procedure 504. For example, the execution node process 508 may issue the database query to a specific endpoint of the compute service manager 512 that is designated to process database queries from stored procedures 504. In turn, the compute service manager 512 may execute the received database query, as was described earlier in relation to FIGS. 1 and 2. Executing the database query may produce specified data and/or an output that is to be returned to the stored procedure 504 as a response to the database query.

Responses to a database query are returned to the stored procedure 504 in a similar manner to which the database query is provided from the stored procedure 504 to the compute service manager 512. For example, the compute service manager 512 provides the response to the execution node process 508. Accordingly, at operation 608, the execution node process 508 receives a response to the database query from the compute service manager 512.

At operation 610, the execution node process 508 converts the response into a remote procedure call, and at operation 612, the execution node process 508 transmits the remote procedure call to the sandbox process 502. The JDBC instance 506 executing in the sandbox process 502 converts the remote procedure call into a format that is compatible with the stored procedure 504 to provide the stored procedure with the response to the database query.

Figure 7:
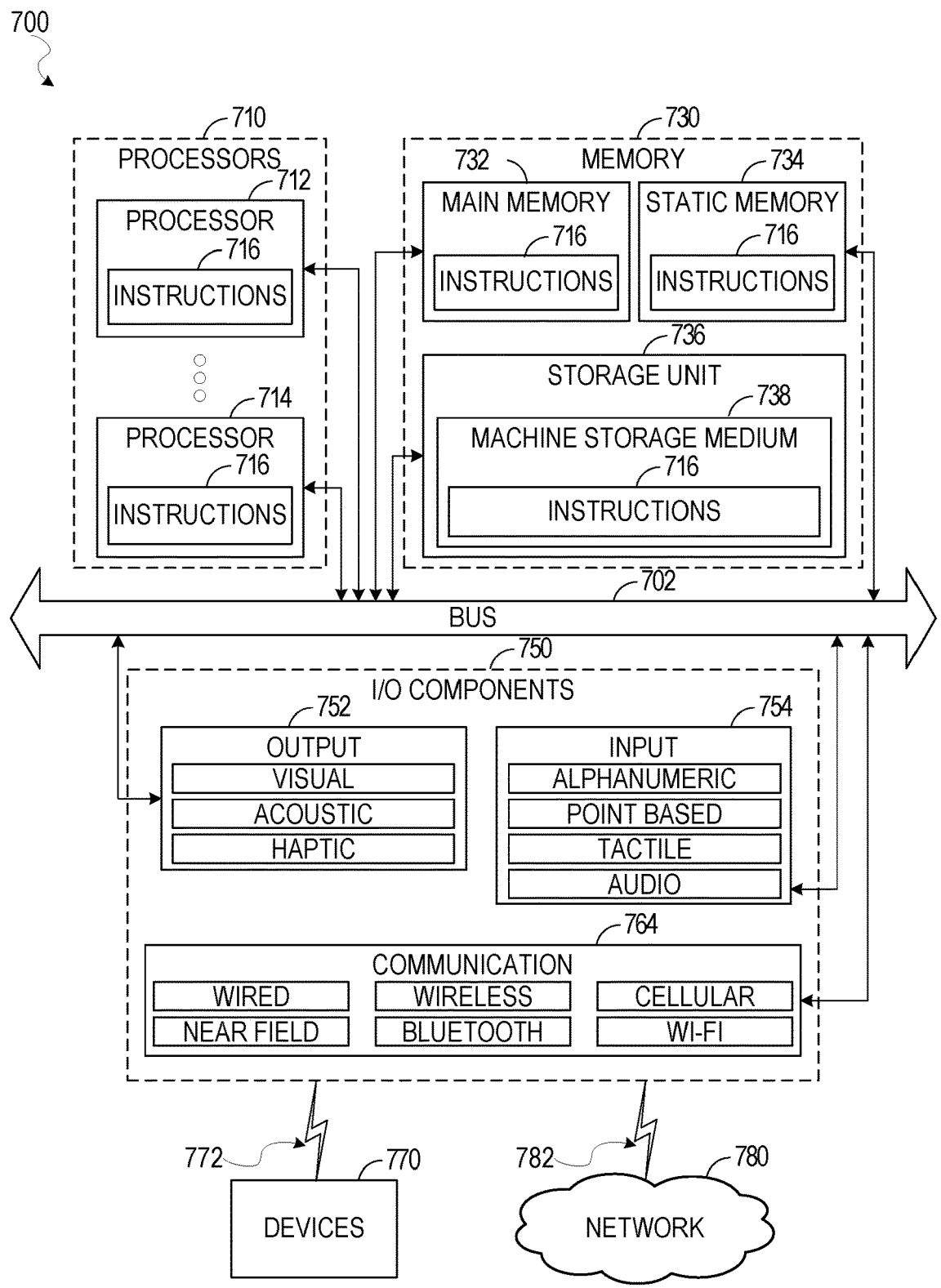
FIG. 7 illustrates a diagrammatic representation of a machine in the form of a computer system within which a set of instructions may be executed for causing the machine to perform any one or more of the methodologies discussed herein, in accordance with some embodiments of the present disclosure.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute any one or more operations of the method 600. As another example, the instructions 716 may cause the machine 700 to implement portions of the data flows illustrated in at least FIG. 4. In this way, the instructions 716 transform a general, non-programmed machine into a particular machine 700 (e.g., the compute service manager 108 or a node in the execution platform 110) that is specially configured to carry out any one of the described and illustrated functions in the manner described herein.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 includes processors 710, memory 730, and input/output (I/O) components 750 configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within machine storage medium 738 of the storage unit 736, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities. The devices 770 may be another machine or any of a wide variety of peripheral devices (e.g., a peripheral device coupled via a universal serial bus (USB)). For example, as noted above, the machine 700 may correspond to any one of the compute service manager 108 or the execution platform 110, and the devices 770 may include the client device 114 or any other computing device described herein as being in communication with the network-based database system 102 or the cloud storage platform 104.

Executable Instructions and Machine Storage Medium

The various memories (e.g., 730, 732, 734, and/or memory of the processor(s) 710 and/or the storage unit 736) may store one or more sets of instructions 716 and data structures (e.g., software) embodying or utilized by any one or more of the methodologies or functions described herein.

These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 600 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
   receiving, by an execution node, a remote procedure call from a stored procedure executing within a sandbox process, the remote procedure call having been transmitted to the execution node using a database connector in the sandbox process;
   converting the remote procedure call into a database query; and
   generating response data by processing the database query on a database.

2. The method of claim 1, further comprising: converting the response data into a second remote procedure call.

3. The method of claim 2, further comprising: transmitting the second remote procedure call to the sandbox process.

4. The method of claim 3, wherein the second remote procedure call is received by the database connector and the database connector converts the second remote procedure call into a format that is compatible with the stored procedure.

5. The method of claim 2, wherein the database connector generates the remote procedure call based on a database connector method invoked by the stored procedure, the database connector method invoked using an Application Programming Interface (API) for communicating with the database connector.

6. The method of claim 5, wherein the database connector method is invoked using a format that is compatible with the stored procedure and the database connector.

7. The method of claim 1, wherein the remote procedure call is a Google Remote Procedure Call (gRPC).

8. The method of claim 1, wherein the database connector comprises a modified driver that limits the database connector to communicating with the execution node.

9. The method of claim 1, further comprising: receiving, by the execution node, a second remote procedure call from the stored procedure executing within the sandbox process.

10. The method of claim 9, wherein the second remote procedure call is transmitted by the database connector that is executing in the sandbox process.

11. The method of claim 9, further comprising: converting the second remote procedure call into a second database query.

12. The method of claim 11, further comprising: generating additional response data by processing the second database query on the database.

13. A system comprising:
   one or more computer processors; and
   one or more computer-readable mediums storing instructions that, when executed by the one or more computer processors, cause the system to perform operations comprising:
   receiving, by an execution node, a remote procedure call from a stored procedure executing within a sandbox process, the remote procedure call having been transmitted to the execution node using a database connector in the sandbox process;
   converting the remote procedure call into a database query; and
   generating response data by processing the database query on a database.

14. The system of claim 13, the operations further comprising: converting the response data into a second remote procedure call.

15. The system of claim 14, the operations further comprising: transmitting the second remote procedure call to the sandbox process.

16. The system of claim 15, wherein the second remote procedure call is received by the database connector and the database connector converts the second remote procedure call into a format that is compatible with the stored procedure.

17. The system of claim 14, wherein the database connector generates the remote procedure call based on a database connector method invoked by the stored procedure, the database connector method invoked using an Application Programming Interface (API) for communicating with the database connector.

18. The system of claim 17, wherein the database connector method is invoked using a format that is compatible with the stored procedure and the database connector.

19. The system of claim 13, wherein the remote procedure call is a Google Remote Procedure Call (gRPC).

20. The system of claim 13, wherein the database connector comprises a modified driver that limits the database connector to communicating with the execution node.

21. The system of claim 13, the operations further comprising: receiving, by the execution node, a second remote procedure call from the stored procedure executing within the sandbox process.

22. The system of claim 21, wherein the second remote procedure call is transmitted by the database connector that is executing in the sandbox process.

23. The system of claim 21, the operations further comprising: converting the second remote procedure call into a second database query.

24. The system of claim 23, the operations further comprising: generating additional response data by processing the second database query on the database.

25. A non-transitory computer-readable medium storing instructions that, when executed by one or more computer devices, cause the one or more computing devices to perform operations comprising:
   receiving, by an execution node, a remote procedure call from a stored procedure executing within a sandbox process, the remote procedure call having been transmitted to the execution node using a database connector in the sandbox process;
   converting the remote procedure call into a database query; and
   generating response data by processing the database query on a database.

26. The non-transitory computer-readable medium of claim 25, the operations further comprising: converting the response data into a second remote procedure call.

27. The non-transitory computer-readable medium of claim 26, the operations further comprising: transmitting the second remote procedure call to the sandbox process.

28. The non-transitory computer-readable medium of claim 27, wherein the second remote procedure call is received by the database connector and the database connector converts the second remote procedure call into a format that is compatible with the stored procedure.

29. The non-transitory computer-readable medium of claim 26, wherein the database connector generates the remote procedure call based on a database connector method invoked by the stored procedure, the database connector method invoked using an Application Programming Interface (API) for communicating with the database connector.

30. The non-transitory computer-readable medium of claim 29, wherein the database connector method is invoked using a format that is compatible with the stored procedure and the database connector.

* * * * *